United States Patent
Anas et al.

(10) Patent No.: US 9,119,146 B2
(45) Date of Patent: Aug. 25, 2015

(54) SCHEDULING OF USER TERMINALS IN COMMUNICATION NETWORK

(75) Inventors: Mohmmad Anas, Hamilton (CA); Ralf Golderer, Leinfelden-Echterdingen (DE); Uwe Herrmann, Ebersberg (DE); Hans Kroener, Geislingen-Weiler (DE); Wolfgang Payer, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 194 days.

(21) Appl. No.: 13/807,354

(22) PCT Filed: Jun. 30, 2010

(86) PCT No.: PCT/EP2010/059299
§ 371 (c)(1),
(2), (4) Date: Dec. 28, 2012

(87) PCT Pub. No.: WO2012/000547
PCT Pub. Date: Jan. 5, 2012

(65) Prior Publication Data
US 2013/0107782 A1 May 2, 2013

(51) Int. Cl.
*H04W 72/04* (2009.01)
*H04W 52/02* (2009.01)
(Continued)

(52) U.S. Cl.
CPC .......... *H04W 52/02* (2013.01); *H04W 72/1231* (2013.01); *H04W 24/10* (2013.01); *H04W 72/085* (2013.01); *H04W 72/1273* (2013.01); *H04W 76/048* (2013.01)

(58) Field of Classification Search
CPC .......... H04W 52/0216; H04W 76/048; H04W 36/0088; H04W 52/0209; H04W 72/042; H04W 72/0453; H04W 72/1278; H04W 72/1289
USPC ........ 370/329, 252, 331, 311; 455/432.1, 436
See application file for complete search history.

(56) References Cited

U.S. PATENT DOCUMENTS 7,966,017 B2 * 6/2011 Kim et al. ............ 455/436
(Continued)

FOREIGN PATENT DOCUMENTS

| EP | 2 182 764 A1 | 5/2010 |
|---|---|---|
| JP | 2010524328 A | 7/2010 |

(Continued)

OTHER PUBLICATIONS

3GPP TS 36.213 V9.2.0 (Jun. 2010), Technical Specification 3rd Generation Partnership Project; Technical Specification Group Radio Access Network; Evolved Universal Terrestrial Radio Access (E-UTRA); Physical layer procedures (Release 9), (80 pages).
(Continued)

*Primary Examiner* — Dang Ton
*Assistant Examiner* — Sai Aung
(74) *Attorney, Agent, or Firm* — Harrington & Smith

(57) ABSTRACT

There is provided a method for scheduling user terminals for downlink transmission in a communication network, the method including determining a duration of a discontinuous reception cycle for a user terminal, wherein the beginning of the cycle triggers a first active period during which the user terminal is in an active mode; and determining an interval between periodic channel quality indicator reports for the user terminal. The method further includes aligning the discontinuous reception cycle with the interval between the periodic channel quality indicator reports such that the periodic channel quality indicator is transmitted within the first active period of the discontinuous reception cycle, receiving the periodic channel quality indicator during the first active period of each discontinuous reception cycle, thus obtaining an up-to-date channel quality indicator for the discontinuous reception cycle, and scheduling the user terminals for downlink transmission by taking the received periodic channel quality indicator into account.

28 Claims, 4 Drawing Sheets

(51) Int. Cl.
*H04W 72/12* (2009.01)
*H04W 24/10* (2009.01)
*H04W 72/08* (2009.01)
*H04W 76/04* (2009.01)

(56) References Cited

U.S. PATENT DOCUMENTS

| | | | |
|---|---|---|---|
| 8,478,285 B2* | 7/2013 | Iwamura et al. | 455/452.1 |
| 8,634,361 B2* | 1/2014 | Womack et al. | 370/329 |
| 2009/0232118 A1* | 9/2009 | Wang et al. | 370/338 |
| 2010/0135159 A1* | 6/2010 | Chun et al. | 370/241 |
| 2010/0135172 A1 | 6/2010 | Cui et al. | 370/252 |
| 2010/0296462 A1* | 11/2010 | Taoka | 370/329 |
| 2011/0002281 A1* | 1/2011 | Terry et al. | 370/329 |
| 2011/0021154 A1* | 1/2011 | Marinier et al. | 455/67.11 |
| 2011/0158188 A1* | 6/2011 | Womack et al. | 370/329 |
| 2011/0294491 A1* | 12/2011 | Fong et al. | 455/422.1 |

FOREIGN PATENT DOCUMENTS

| | | |
|---|---|---|
| WO | WO 2008/132650 A2 | 11/2008 |
| WO | WO 2008/155910 A1 | 12/2008 |
| WO | WO 2009/099931 A1 | 8/2009 |

OTHER PUBLICATIONS

R2-081866, Some Details on CQI Transmission during DRX, TSG-RAN WG2 #61 Shenzhen, China, Mar. 31-Apr. 4, 2008, R2-081866, [Online], Mar. 31, 2008, pp. 1-10, XP002536864, (10 pages).

3GPP TS 36 321, V9.3.0 (Jun. 2010); Technical Specification 3rd Generation Partnership Project; Technical Specification Group Radio Access Network; Evolved Universal Terrestrial Radio Access (E-UTRA); Medium Access Control (MAC) protocol specification (Release 9), (48 pages).

3GPP TS 36.321 V8.9.0 (Jun. 2010) Technical Specification 3rd Generation Partnership Project; Technical Specification Group Radio Access Network; Evolved Universal Terrestrial Radio Access (E-UTRA); Medium Access Control (MAC) protocol specification (Release 8), (47 pages).

R2-070411, 3GPP TSG-RAN2 Meeting #56bis, Sorrento, Italy, Jan. 15-19, 2007, "LS on DRX interval and CQI reporting cycle in LTE", Source: TSG RAN WG2, 2 pgs.

R2-071847, 3GPP TSG-RAN WG2 Meeting #58, Kobe, Japan May 7-11, 2007, "CQI Reporting with regards to DRX operation" Ericsson, 2 pgs.

R2-080808, TSG-RAN WG2 #61, Sorrento, Italy, Feb. 11-15, 2008, "SRS Transmission Support in DRX Mode", Research in Motion, Ltd., 2 pgs.

R2-090244, 3GPP TSG-RAN WG2 Meeting #64bis, Ljubljana, Slovenia, Jan. 12-16, 2009, "CQI configuration and DRX", InterDigital, 2 pgs.

* cited by examiner

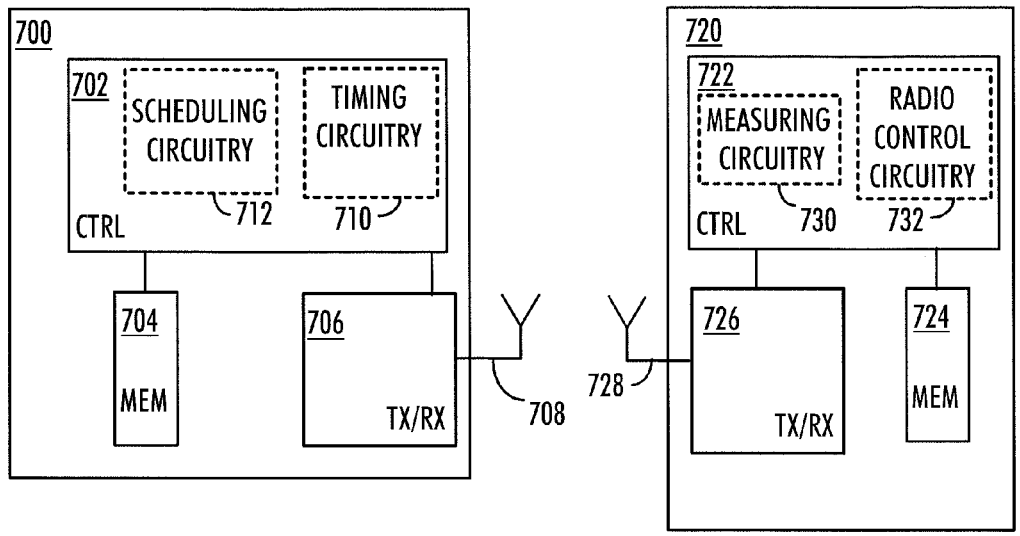
FIG. 7
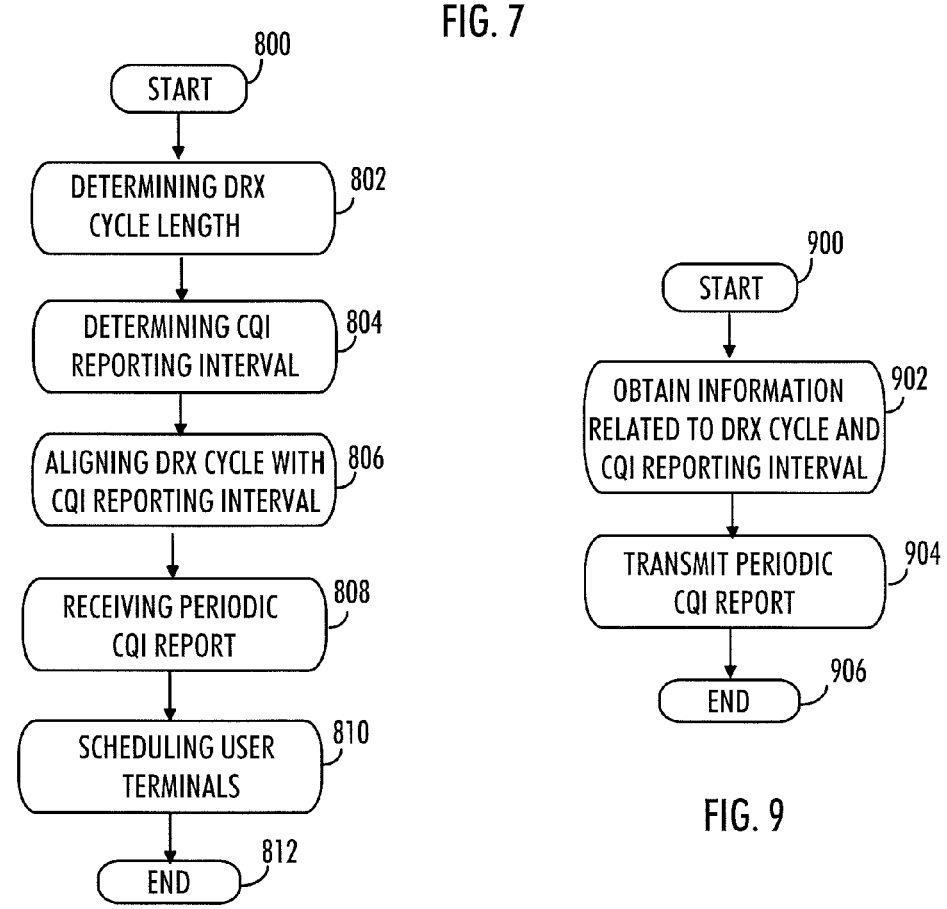
FIG. 8
FIG. 9

SCHEDULING OF USER TERMINALS IN COMMUNICATION NETWORK

FIELD

The invention relates generally to mobile communication networks. More particularly, the invention relates to scheduling of user terminals (UT) in wireless communication network when at least one UT is applying discontinuous reception (DRX).

BACKGROUND

In order to fully benefit from radio conditions in a radio interface, a scheduler is applied to schedule the downlink transmissions from the eNB to many UTs. However, several problems are related to state-of-the-art scheduling. Thus, it is important to provide a solution to improve the scheduling so that the radio interface can be utilized in more efficient way.

BRIEF DESCRIPTION OF THE INVENTION

Embodiments of the invention seek to improve the scheduling of UTs when at least one UT is applying discontinuous reception (DRX).

According to an aspect of the invention, there are provided methods as specified in claims 1 and 22.

According to an aspect of the invention, there are provided apparatuses as specified in claims 11, 21, 29 and 36.

According to an aspect of the invention, there are provided computer program products as specified in claims 37 and 38.

Embodiments of the invention are defined in the dependent claims.

LIST OF DRAWINGS

In the following, the invention will be described in greater detail with reference to the embodiments and the accompanying drawings, in which FIG. 1 presents a communication network according to an embodiment;

FIG. 7 shows apparatuses according to embodiments;

FIG. 8 illustrates a method for scheduling according to an embodiment; and

FIG. 9 illustrates a method for transmitting data according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UTs via the so-called radio interface to the network.

Figure 1:
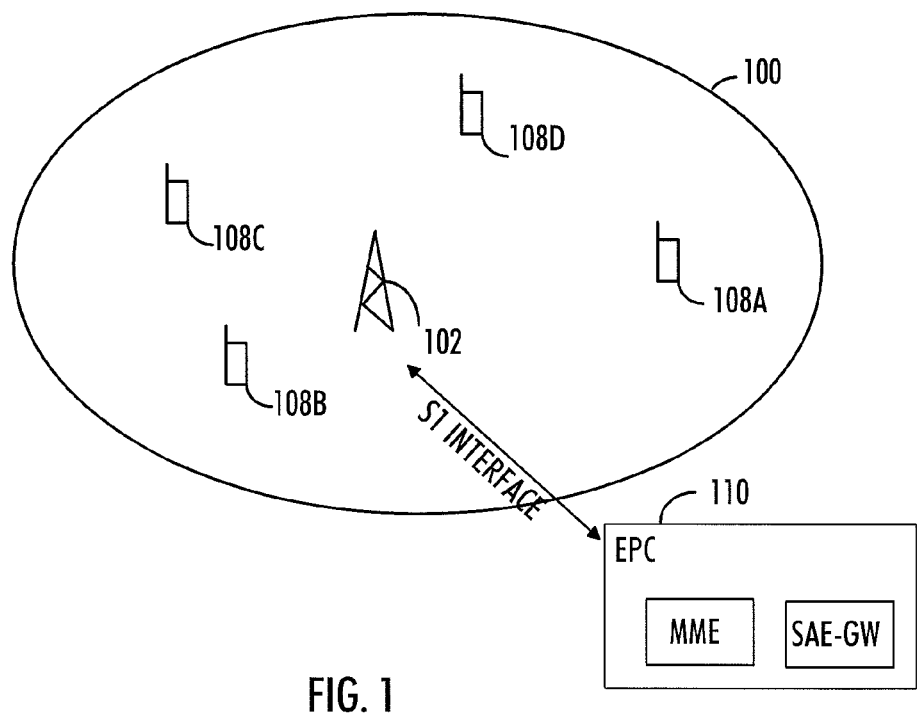

FIG. 1 shows a communication network, according to an embodiment. As explained, the communication network may comprise a base station 102. The public base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The public base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may also be called a wide area (WA) base station due to its broad coverage area. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for example. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be as-signed to serve a set of eNBs. This means that an eNB may be connected to multiple MMEs and SAE-GWs, although each user terminal is served by one MME and/or S-GW at a time.

According to an embodiment, the eNB 102 may establish a connection with a user terminal (UT) 108A to 108D such as a mobile user terminal, a palm computer, user equipment or any other apparatus capable of operating in a mobile communication network. That is, the UT 108A to 108D may perform data communication with the eNB 102. From now on, reference numeral 108 denotes any of the UTs 108A to 108D.

The eNB 102 may comprise a scheduler for scheduling UTs 108 for downlink/uplink transmission. That is, the scheduling of UTs will be performed by schedulers. There may be one uplink (UL) scheduler for UL scheduling and one downlink (DL) scheduler for DL scheduling. Such a scheduler might be further divided into a time-domain (TD) scheduler part and a frequency-domain (FD) part. The downlink and uplink time-domain scheduler parts may select a subset of UTs for a certain point in time that should get downlink and uplink resources to transmit their data. The decision to allow a grant for transmission (scheduling decision) will be based on quality of service aspects, data availability, pending retransmissions, etc. The downlink and uplink frequency-domain scheduler parts allocate the frequency resources on a physical downlink shared channel (PDSCH) and a physical uplink shared channel (PUSCH), respectively for the subset of UTs provided by the time-domain scheduler parts.

Alternatively, one scheduler may take care of both the time-domain scheduling and the frequency-domain scheduling. This may happen in one step (simultaneous scheduling in both domains) or consecutively.

In order to minimize the UT battery consumption and to maximize the UT battery lifetime, the UTs 108 may apply a discontinuous reception (DRX). If DRX is disabled, a UT 108 always monitors the physical downlink control channel (PDCCH) for UL and DL grants, which are indications sent on the PDCCH in order to grant a DL or a UL transmission. This is energy consuming because most of the time there is nothing to listen to. Thus, the UT 108 uses its battery for nothing. The DRX may be enabled for a user terminal if it is connected such that its radio resources may be controlled (RRC Connected mode).

According to the functionality of DRX, the timeline is divided in DRX cycles of certain number of subframes. One subframe is in the LTE defined as ⅒ of a radio frame and the length of a subframe is 1 millisecond (ms). The DRX cycles are consecutive, that is, one DRX cycle after another. The start of DRX cycle is linked to the system frame number (SFN) plus a UT-specific offset. For example, in the LTE, the DRX cycles can have the following lengths: 10, 20, 32, 40, 64, 80, 128, 160, 256, 320, 512, 640, 1024, 1280, 2048, 2560 ms.

The DRX cycle comprises certain periods when the UT 108 is in active mode. This is called a "DRX Active"-mode. When the UT 108 is in the DRX active mode, it monitors the PDCCH for UL and DL grants. By doing this, it can receive DL transmissions and can perform UL transmissions. However, when the UT 108 is in sleep mode ("DRX Sleep"-mode), the UT 108 does not monitor the PDCCH for UL and DL grants. By doing this, it will not receive DL transmissions nor perform UL transmissions. During periods of DRX Sleep, the parts of the UT 108 receiver which deal with the reception on the PDCCH and PDSCH can be switched off and the UT can save power. Thus, the battery lifetime is extended. The UT 108 is in the sleep mode when it is not in the active mode.

Further, when the UT 108 is in the sleep mode, channel quality indicators (CQI), rank indicators (RI), and precoding matrix indicator (PMI) on the physical uplink control channel (PUCCH) nor sounding reference symbols (SRS) cannot be transmitted from the UT 108 to the eNB 102. Therefore, the throughput of the communication system may suffer due to lack of up-to-date channel condition information, for example.

Beside other timers defined for the DRX, the DRX OnDuration Timer and the DRX Inactivity Timer are the most important ones. The DRX OnDuration timer triggers the first active period within the DRX cycle. There is one timer for each UT 108. The timer is started with the first subframe of each DRX cycle and, as said, when running, the UR 108 is DRX Active. For example, in the LTE, possible values for the timer are 1, 2, 3, 4, 5, 6, 8, 10, 20, 30, 40, 50, 60, 80, 100, 200 ms. The choice of the value may be given to the UT 108 via communication from eNB 102 during initial setup, for example, or it may be reconfigured to the UT 108.

The DRX Inactivity timer will be started or restarted if the PDCCH indicates a new UL or DL transmission and if the UT 108 is in DRX Active-mode at that time. Thus, when the Inactivity timer is running, the UT 108 is in active mode. There is one timer for each UT 108. For example, in the LTE, possible values for the timer are 1, 2, 3, 4, 5, 6, 8, 10, 20, 30, 40, 50, 60, 80, 100, 200, 300, 500, 750, 1280, 1920, 2560 ms. The choice of the value may be given to the UT 108 via communication from eNB 102 during initial setup, for example, or it may be reconfigured to the UT 108.

Figure 2:
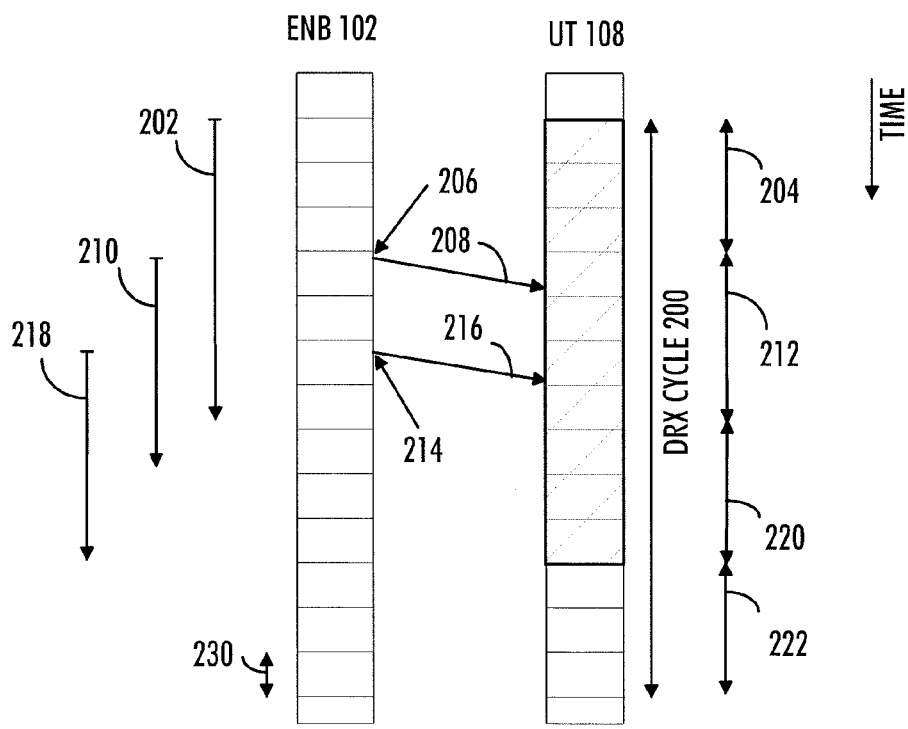
FIG. 2 shows functionalities during a cycle of a discontinuous reception according to an embodiment.

The working principle of DRX for one DRX cycle is shown in FIG. 2. FIG. 2 shows a sample DRX cycle 200 comprising one or more subframes 230, wherein the duration of each subframe 230 may be 1 ms, as specified in the LTE. In the beginning of every DRX cycle 200 the DRX OnDuration timer 202 may be started. As a result, the UT 108 is in active mode for the first subframes of the DRX cycle due to the ongoing OnDuration timer 202 and can receive DL and UL grants. The UT 108 being active is shown with right leaning diagonal lines. The active mode of the UT 108 due to the OnDuration timer is shown with reference numeral 204. The duration for the OnDuration timer 202 may be predetermined, as explained before.

At point of time 206, a DL grant 208 will be received on PDCCH. The grant 208 may be given because there is existing DL data on DL buffer of the eNB 102 that is to be sent to UT 108 via PDSCH. The grant 208 triggers the DRX Inactivity timer 210 at point 206 which prolongs the DRX Active-mode, as shown with reference numerals 212 and 220. To be precise, the active mode of the UT 108 due to the OnDuration timer and the first InActivity timer is shown with reference numeral 212. The length of the Inactivity timer may be set beforehand, as explained earlier.

At point of time 214 another grant 216 may be received. As a result, the grant 216 triggers the DRX Inactivity timer 218 at point 214 which prolongs the DRX Active mode, as shown with reference numerals 212 and 220. To be precise, the active mode of the UT 108 due to the OnDuration timer and the first InActivity timer is shown with reference numeral 212, whereas the active mode of the UT 108 due to the first and/or second InActivity timer is shown with reference numeral 220.

When the OnDuration timer 202 and each of the InActivity timers 210 and 218 have expired, the UT 108 may turn into sleep mode for the rest of the DRX cycle 200 (assuming the duration of the DRX cycle 200 extends over the last remaining timer 202, 210, 218). This sleep-mode is shown to exist with reference numeral 222. During sleep mode, the UT 108 does not listen to PDCCH for grants and saves battery life of the UT 108.

If another grant would be given (when the UT 108 is in active mode for whatever reason), it would trigger the start of a third InActivity timer possibly extending the active mode further. Thus, restarting of the DRX Inactivity timer 210, 218 means that the DRX Inactivity timer window will be moved with every grant 208, 216 indicating a new transmission in UL and/or DL. If the eNB 102 continuously gives such grants to the UT 108, the DRX Inactivity timer window will be moved beyond the end of the DRX cycle 200 into the next DRX Cycle which takes place immediately after the previous DRX cycle.

During sleep mode 222, the UT 108 may not get any further grants from eNB 102 until it awakes again. This awaking may take place at the beginning of the next DRX cycle when the DRX OnDuration timer will be started. In addition, when the UT 108 decides to send out a scheduling request to the eNB 102, the UT 108 may turn into the DRX active mode. The sending of scheduling request may take place at any time within the DRX Cycle 200 in order to indicate the eNB 102 that there are data in the buffers of the UT 108 and that the UT 108 wants to perform UL transmissions. This is shown in more detail in FIG. 3.

Figure 3:
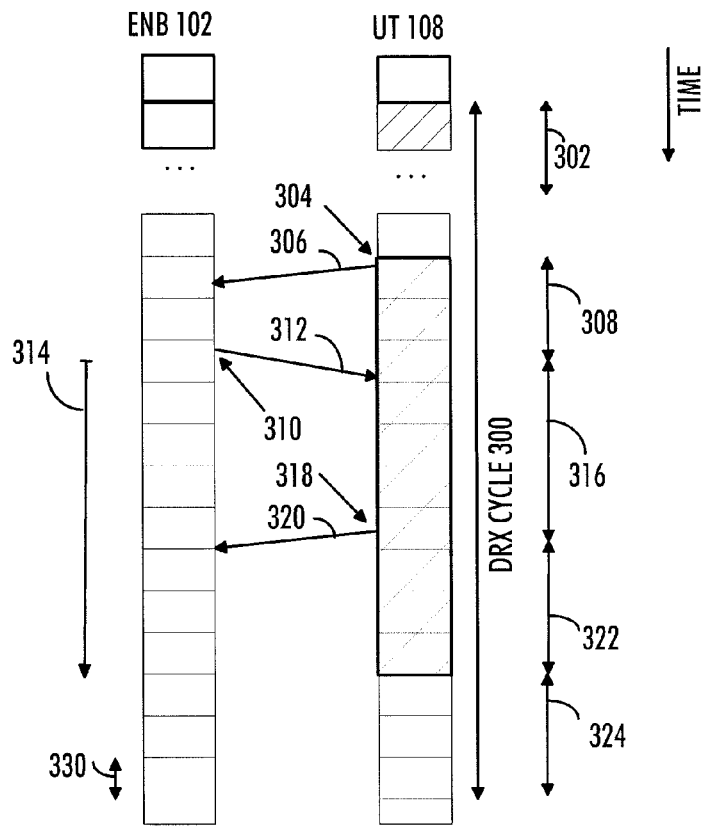
FIG. 3 shows functionalities during a cycle of the discontinuous reception according to an embodiment.

FIG. 3 shows an exemplary DRX cycle 300 comprising of one or more subframes 330. As earlier, the DRX cycle 300 triggers the start of OnDuration timer during which the UT 108 is in DRX active mode as shown with reference numeral 302.

At point 304, the UT 108 sends a scheduling request 306 to the eNB 102. As a consequence, the UT 108 becomes DRX active 308 due to the pending scheduling request (and only due to the pending request if the OnDuration timer has already expired as assumed in the figure). The eNB 102 decides to grant the UL grant 312 at point 310, which triggers an InActivity timer 314 causing the UT 108 to be in active mode a shown with reference numeral 316. To be precise, the UT 108 is active during period 316 also due to the pending scheduling request because the user data waiting to be sent is not yet transmitted to the eNB 102.

At point 318 the UT 108 transmits the data 320 on PUSCH to the eNB 108. As a consequence, the DRX active mode due to pending scheduling request is now terminated. However, if the inactivity timer extends further, the UT 108 is DRX active due to the InActivity timer, as shown with reference numeral 322. After this period, the UT 108 may turn into DRX sleep-mode 324 for the rest of the DRX cycle 300.

For example, in the LTE, if the UT 108 has not been given any UL or DL grants during the DRX OnDuration and the UT 108 does not turn DRX Active later during the cycle, e.g. by the UT 108 sending a scheduling request, there is no possibility to start the DRX InActivity timer for the rest of the DRX cycle, even if new DL data have arrived at the eNB 102. In this case no DL transmissions will take place in this DRX cycle.

In order to most optimally utilize the available radio channel conditions, the UT 108 may transmit a channel quality indicator (CQI) to the eNB 102. The CQI may be sent by means of a CQI report in UL. The CQI is UT-specific and reflects the current channel conditions from perspective of the UT 102. Moreover, the CQI may be used by the eNB 108 for scheduling the upcoming transmissions in DL upon the frequency resources with the best channel conditions with respect to the UT and with a proper modulation and coding scheme (MCS). However, the CQI will not be sent if the UT 108 is in DRX sleep mode.

There are different types of CQIs available. The number of different types of CQIs may be preconfigured to the system. According to an embodiment, there are five types of CQIs available. Firstly, a default CQI is a default value which will be used for scheduling by the eNB 102 in case that no CQI value derived from CQI reports is available and CQI values from the past are outdated.

Secondly, a historical CQI value is derived from CQI reports received in previously. It reflects the channel conditions of the past and is not up-to-date. The historical CQI results from the last received CQI report(s) aged by an aging factor over the time. However, using it may still give some gain with respect to throughput compared with just using a default CQI value.

Thirdly, a periodic wideband CQI (periodic frequency non-selective) may periodically be reported to eNB 102 on PUCCH. It reflects the average channel quality of all physical resource blocks (PRB). Further, it may be reported more frequently compared with other types of CQI reports as only one single value will be transmitted.

Fourthly, a periodic subband CQI (periodic frequency selective) may periodically be reported on PUCCH to the eNB 108. It reflects the channel quality of a certain amount of PRBs over one subband of predefined size. This is more complex than the periodic wideband CQI in terms of reporting because it might take some time to report the CQIs of all subbands of the entire frequency band due to limited PUCCH resources that are shared among all UTs.

Fifthly, an aperiodic frequency selective CQI may be reported on PUSCH using an uplink transmission. However, this may be requested by the eNB 102 by means of an indication in an UL grant. Therefore, this is not reported periodically. The aperiodic CQI reflects the channel quality of all the subbands of the entire frequency band.

According to an embodiment, the five different CQI reports given above may be differentiated based on their quality. By quality it is meant that how reliable, up-to-date and accurate the information carried in the CQI is. The CQI carries information related to prevailing channel conditions between the UT 108 and the eNB 102. According to an embodiment, the increasing order of quality is as follows: a default channel quality indicator, a historical channel quality indicator, a periodic wideband channel quality indicator, a periodic frequency selective channel quality indicator, and an aperiodic channel quality indicator. Therefore, the aperiodic CQI provides the best quality whereas the default CQI value is the one with the poorest quality.

Figure 4:
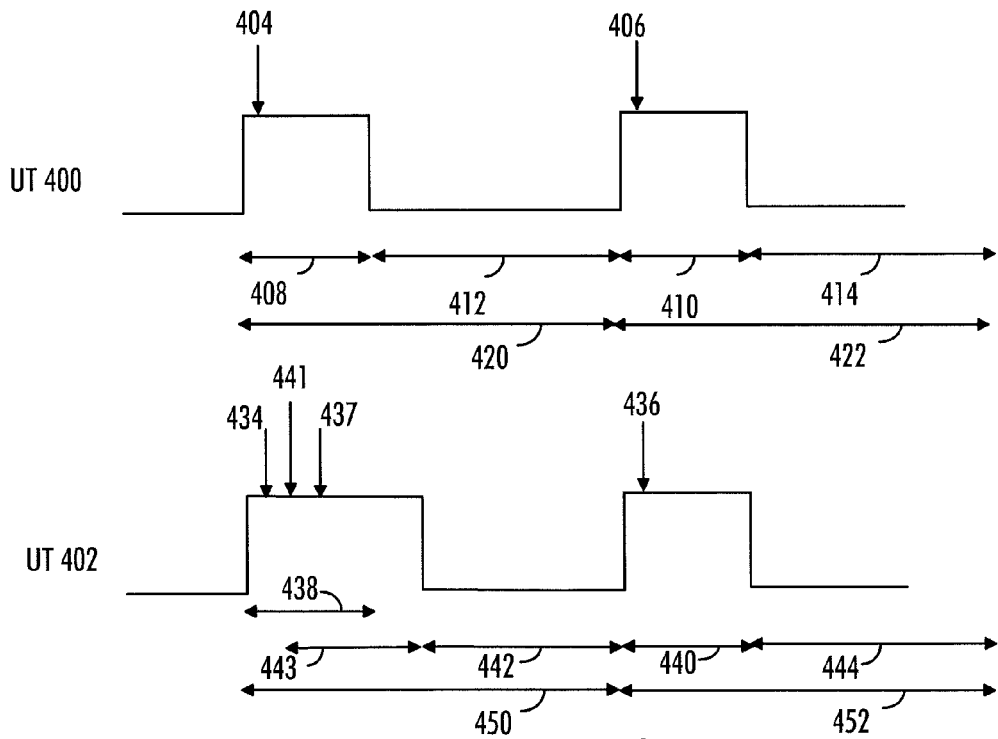
FIG. 4 shows the transmission of channel quality indicators according to an embodiment.

The higher the CQI value, the higher the selected MCS is, which is chosen by eNB 102 for scheduling the UT 108 for the next upcoming subframes. Further, the higher the MCS, the larger the transport block sizes are, with respect to the same number of PRBs. Therefore, it is clear that selecting a non-adequate MCS will have consequences: In case of a higher MCS compared to the currently existing radio conditions, retransmissions will happen more often and a lowered transmission rate will be the result. In case of using a smaller MCS, transport data may not be transmitted with that high encoding rate that would be possible from current condition of the radio layer. A too low transmission rate will be the result. FIG. 4 shows how the CQI reports take place in conjunction with the DRX. UT 400 having no InActivity timers triggered during a DRX cycles 420, 422 may transmit the periodic CQI reports 404, 406 in the DRX OnDuration phases 408, 410 only. There will be no reports of CQI during the sleep mode 412, 414. Further, the aperiodic CQI reporting is not possible as there are no UL transmissions.

UT 402 may similarly transmit the periodic CQI reports 434 and 436 during the DRX Active phases 438 and 440 of the DRX cycles 450, 452, respectively. Further, as there is a grant 441 for UL transmission given, the InActivity timer 443 will be started. Thus, the UT 402 may send an aperiodic frequency selective CQI report 437, if requested in the grant. There will be no reports of CQI during the sleep modes 442, 444.

One of the problems related to CQI reporting with UT applying the DRX is that there are no transmissions of CQI reports when the UT is DRX sleep. Next time, after possibly a long period of DRX sleep, when the UT becomes DRX Active and may again be scheduled in DL transmission, there is no up-to-date CQI value available. The CQI values received in the previous DRX Active period are not up-to-date and might not reflect the current channel conditions. This is especially relevant for the start of the DRX cycles as the start of a DRX cycle may follow a long period of DRX sleep.

Scheduling of a UT for DL transmission after a period of DRX sleep may be therefore need to be conducted by using the default or historical CQI values. When and if receiving a periodic CQI report, the periodic CQI may be used for scheduling of transmissions a few subframes later after the eNB has processed the scheduling. In case there is no periodic CQI report available within the period of DRX Active, then the default or historical CQI value will be used for the entire period. This may cause the transmissions to be performed improper MCS which might cause suboptimal throughputs.

According to an embodiment, there is provided a method and apparatus for scheduling user terminals for downlink transmission in a communication network. As earlier explained, the user terminals applying the DRX are in DRX active mode at least part of the DRX cycle. The apparatus for performing the scheduling may be the eNB 102 of FIG. 1, or the apparatus may be a separate communication element in the communication network. The apparatus may be called a scheduler. For the sake of clarity, let us assume that the apparatus is the eNB 102 (or that the apparatus is comprised in the eNB 102).

The eNB 102 may determine the duration of the DRX cycle for the UT 108, wherein the beginning of the cycle triggers a first active period during which the user terminal is in an active mode. The first active period may be the period when the OnDuration timer is running. Further active periods may be triggered by the InActivity timer or a scheduling request from the UT. The eNB 102 may further determine an interval between periodic CQI reports for the user terminal. By periodic CQI it is meant either the periodic wideband CQI and/or the periodic subband CQI. That, is the eNB 102 may determine reporting intervals for both of the periodic CQI reports or the interval for only one the two periodic CQI types. The determined interval for CQI reports and the DRX cycle may be UT-specific and may thus vary between different UTs.

According to an embodiment, the eNB may further align the DRX cycle with the interval between the periodic CQI reports such that the periodic CQI is transmitted within the first active period of the DRX cycle. This enables obtaining CQI reports in the beginning of the DRX cycle by positioning periodic CQI reports in the beginning of the DRX cycle. This has the advantage that the up-to-date CQI value is readily available at the beginning of the DRX cycle. Therefore the eNB 102 may not have to the use the default or historical CQI values which are, generally, inaccurate and out-dated.

Thus, in order to obtain the CQI report in the beginning of the DRX cycle, the periodic CQI reports and the start of DRX cycles shall be aligned so that the periodic CQI reports can be transmitted when the UT is DRX Active. This is the DRX OnDuration period which is triggered by the beginning of a DRX cycle.

According to an embodiment, the DRX cycle is started in every subframe which meets the following equation: [(SFN*10)+$N_{SF}$] modulo ($T_{DRX\ cycle}$)=$DRX_{offset}$, wherein SFN is the system frame number, $N_{SF}$ is the current subframe number, $T_{DRX}$ is the duration of the DRX cycle, and $DRX_{offset}$ is the predefined offset for the start of the DRX period.

The periodic CQI reporting will analogously be positioned in the time line. Thus, CQI reporting is performed in every subframe which fulfills the equation: [(SFN*10)+$N_{SF}$−$CQI_{offset}$] modulo ($CQI_{period}$)=0. where the $CQI_{offset}$ is a predetermined CQI reporting offset and $CQI_{period}$ is a predefined period between two consecutive CQI reports.

In order to further enhance the alignment, according to an embodiment, the duration of the DRX cycle is determined to be an integral multiple of the interval between the periodic CQI reports. This has the advantage that the periodic CQI reports are received in the beginning of each DRX cycle. Further, in case the integral multiple is two or more, the possibility to receive periodic CQIs more than once during one DRX cycle is enabled.

Without the DRX cycle being an integral multiple of the interval between the periodic CQI reports, the first DRX cycle aligned with the interval would result in the period CQI being received by the eNB 108, as designed. However, the adjacent DRX cycles might not receive the periodic CQI in case of misalignment.

Therefore, the eNB 102 may receive the periodic channel quality indicator during the first active period of each DRX cycle, thus obtaining an up-to-date channel quality indicator for each DRX cycle. This is beneficial so that at least one CQI report per each DRX cycle will be transmitted. This may be important for the shorter DRX cycle lengths in order to keep the UTs synchronized in UL in case of inactivity. Such an UL transmission can be used for calculation of the necessary timing alignment offset. Further, the time domain scheduling can result in selecting UTs according to actual channel conditions with up-to-date averaged MCS. This enhances the throughput gain compared to case where only the default or the historical CQI is used.

According to an embodiment, the eNB 102 receives the periodic channel quality indicator at a subframe which is available for an uplink transmission and closest to the start of the discontinuous reception cycle, preferably at the first subframe of the discontinuous reception cycle.

As said, the preferred subframe of transmission of the periodic CQI report is the first subframe of each DRX cycle. However, it might be that due to other reasons like positioning of the rank indicator (RI) on the PUCCH, the periodic CQI reports are not transmitted in the first subframe. In such a case the subframe closest to the start of the DRX cycle but still within the DRX OnDuration phase may be chosen for the transmission of the periodic CQI report.

Figure 5A:
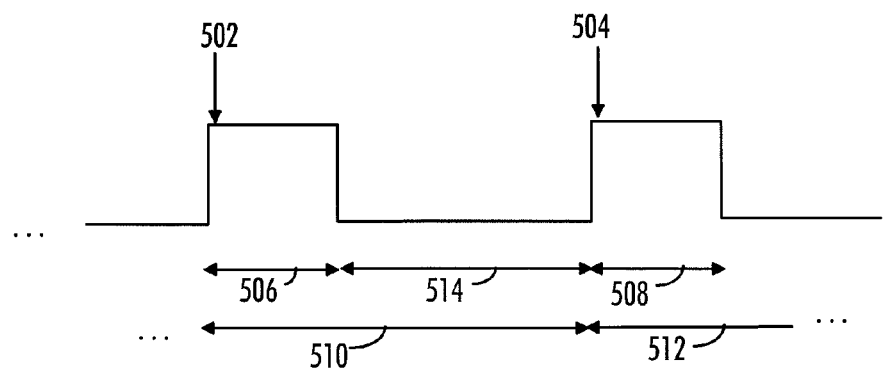
FIGS. 5A and 5B show the transmissions of the channel quality indicators according to embodiments.

FIG. 5 illustrates the transmission of the periodic CQI reports according to an embodiment. FIG. 5A shows the case when the first subframe is available for UL transmission and is therefore used for the periodic CQI reporting. As shown, the CQI reports 502 and 504 are transmitted to the eNB on the first subframes of the first active periods 506 and 508 of each cycle 510 and 512, respectively. There is no reporting during the sleep mode 514.

Figure 5B:
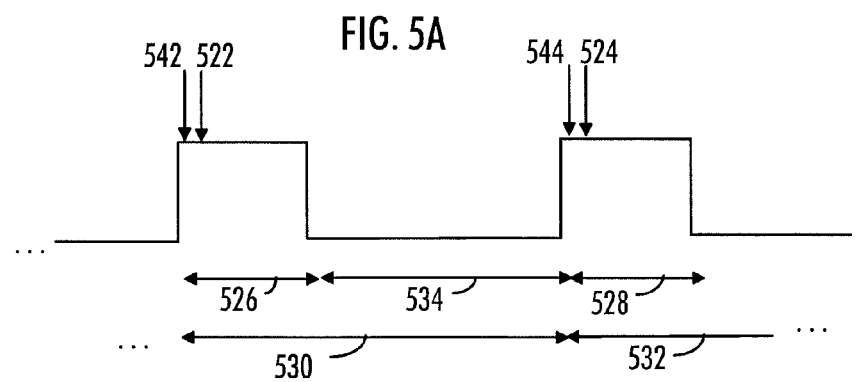

FIG. 5B shows the case when the first subframe is not available for UL transmission due to RI transmissions, for example. Therefore, the second subframe is used for transmission of the periodic CQI reports, as the second subframe is the closest subframe to the start of the DRX cycle which is available for transmission. As shown, the CQI reports 522 and 524 are transmitted to the eNB 102 on the second subframes of the first active periods 526 and 528 of each cycle 530 and 532, respectively. There is no reporting during the sleep mode 534. The RIs 542 and 544 are transmitted on the first subframes of the first active periods 526 and 528 (OnDuration periods).

Having received the periodic, up-to-date, CQI report from the UT 102, the eNB 102 may schedule the user terminals for downlink transmission by taking the received periodic CQI into account. By doing this, the most optimum MCS may be used for the corresponding UT. Time-domain scheduling and frequency-domain scheduling may select the UTs and assign PRBs according to current channel conditions and give proper MCS for the assigned PRBs. Hence, the throughput gain may be increased. Before obtaining the periodic CQI report and during the time when the eNB 102 processes the received periodic CQI report, a default or a historical CQI value may be used for scheduling.

Further, according to an embodiment, the eNB 102 may assign a grant for the UL transmission of an aperiodic CQI report during the first active period. The grant may inform the UT 102 to assigning sufficient resources to carry a frequency selective CQI report to the eNB 102 in one transport block at the beginning of the DRX cycle. This enables obtaining the CQI value with the best accuracy and reliability. The aperiodic frequency selective CQI reports are the CQI reports which transmit CQI values of the entire frequency band in one report and which can be regarded to reflect discrete up-to-date channel condition information at one point in time. Therefore it can be seen as the CQI report with the best CQI quality. The advantage is that the best possible quality CQI is obtained as early as possible after a period of DRX Sleep.

As a result, the eNB 102 may receive the aperiodic channel quality indicator from the UT 108 during the first active period. In an embodiment, the aperiodic CQI is received by the eNB 102 from the UT 108 in the first subframe of the DRX cycle (i.e., the first subframe after the start of the first active period). This may be the case for a time division duplex (TDD) system when the aperiodic CQI and the periodic CQI are due in the same subframe and an UL grant is available. Then only aperiodic CQI shall be transmitted at the subframe. Then, the eNB may schedule the user terminals for downlink transmission by taking the received aperiodic CQI into account. Without the aperiodic CQI, the scheduling is performed on the basis of the periodic CQI (once it has been received).

However according to an embodiment, performing the assignment of the grant and the reception of the aperiodic channel quality indicator is dependent on at least one of the following conditions: uplink transmission capacity exists, no user data needs to be sent in uplink, and substantially all resource blocks of a downlink transmission subframe are allocated. That is, the performing of the aperiodic CQI request by the eNB 102 may be dependent on one of those conditions or any possible combination of the conditions. The existence of the user data that needs to be sent may be checked from the UL buffer at the UT 108 by means of UL buffer status check. As a result, the aperiodic CQI report may be dependent on whether uplink data are to be sent by the UT 108 or not, whether there is enough uplink capacity or not, and whether the downlink is fully loaded or not. In one embodiment, the aperiodic CQI is requested when a grant for UL data is given to the UT 108. In one embodiment, the aperiodic CQI is requested when there is no data to be sent in the UL but when there is spare uplink capacity left. In one embodiment, the aperiodic CQI is requested when there is no data to be sent in the UL and there is spare uplink capacity and the downlink is fully loaded.

If substantially all resource blocks (RB) are allocated, there is most likely high load in the cell. According to an embodiment, the request for the aperiodic CQI may be done only in the case of high load regarding the DL transmissions within the affected cell. This is because, in this case there is a need to know the exact channel conditions for the UT concerned and the aperiodic CQI provides the best quality. In case of low load, the assignment of the UL grant for the aperiodic CQI transmission (request for the aperiodic CQI) need not be performed.

Figure 6:
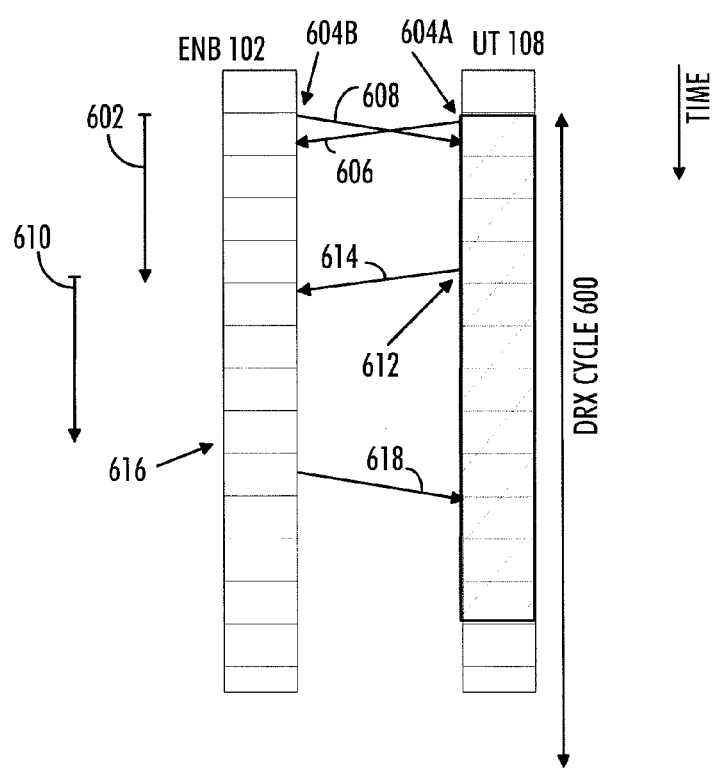
FIG. 6 shows functionalities during a cycle of the discontinuous reception cycle and transmission of channel quality indicators according to an embodiment.

FIG. 6 illustrates the use of CQI reports according to an embodiment. During the DRX cycle 600, the first active period is the OnDuration period. At the first subframe 604A of the first active period, the UT 108 transmits the periodic CQI report 606. The periodic CQI report may be the wideband periodic CQI report or the subband periodic CQI report. At point 604B, the eNB 102 assigns a grant 608 to the UT 108 for the transmission of aperiodic CQI report. This grant triggers the InActivity timer during which the UT 108 is in active mode.

Even though the eNB 102 receives the periodic CQI report 606, the scheduling during the first few subframes (let us assume four subframes) as shown with reference numeral period 602 may take place by using the default or the historical CQI value due to eNB's 102 internal processing. After the processing is accomplished, the scheduling takes into account the received periodical CQI report 606. The period during which the periodic CQI is taken into account is shown with reference numeral 610.

At point of time 612, the UT 108 finally transmits the requested aperiodic CQI report 614 to the eNB 102. Again, some processing may be required by the eNB 102. Therefore, the aperiodic CQI 614 is taken into account in the scheduling process only after a few subframes. The point of time after which the aperiodic CQI is taken into account in the scheduling is shown with reference numeral 616. Therefore, the DL data 618 sent on PUSCH after the point 616 may be scheduled such that the best available CQI, the aperiodic CQI, is noted.

When the UT 108 transmits the aperiodic CQI to the eNB 102, the UT 108 may transmit an UL buffer status report and a power headroom report to the eNB 108 as well, if capacity allows this. The power headroom report (PHR) indicates the difference between the maximum UT transmit power and the actual transmit power on PUSCH. This may be send as part of a MAC control element.

The eNB 102 may further prioritize the UTs in the downlink transmission scheduling based on the quality of the available CQIs from the user terminals, wherein the quality of the CQI is determined by the type of the CQI obtained from a user terminal. According to one embodiment, the increasing order of quality is as follows: a default CQI, a historical CQI, a periodic wideband CQI, a periodic frequency selective CQI, and an aperiodic CQI. However, in case of different types of CQIs available, the order may vary.

According to embodiment, the prioritizing is made in the time-domain scheduling. Alternatively or in addition, the prioritizing of the UTs is performed in the frequency-domain scheduling.

According to an embodiment, the eNB 102 may prioritize UTs 108 with respect to other UTs in DL time- and/or frequency-domain scheduling by means of a weighting factor which takes into account the quality of the available CQI value. The weighting factor shall increase with every higher quality level from the default CQI up to the aperiodic CQI.

Thus, the criterion $C_i(t)$, according to which scheduling of UT i depends e.g. on QoS information and channel quality, is given as $$C_i(t) = f(QoS, \text{channel quality}(t), \ldots), \quad (1)$$

wherein t is the upcoming subframe and f is a term denoting a function of some parameters, may be enhanced for the UTs running in DRX mode by a weighting factor as follows:

$$C^{DRX}_i(t) = Ci(t) * W_{CQI} (\text{CQI quality level}). \quad (2)$$

In Equation (2), the $W_{CQI}$ is the weighting factor taking the quality of the available CQI into account. According to an embodiment, the criterion $C^{DRX}_i(t)$ may be used for prioritizing UTs in DL scheduling.

Based on the prioritizing, according to an embodiment, the eNB 102 may assign a probability for performing downlink transmission to a certain user terminal, wherein the probability is proportional to the quality of the available channel quality indicator such that the lower the quality of the available channel quality indicator from the user terminal is, the lower is the probability for performing downlink transmission to the user terminal. The probability information may then be utilized in prioritizing.

According to an embodiment, the prioritizing may lead to restraining downlink transmission to a certain UT if the available CQI of the user terminal is either the default CQI, the historical CQI, or a periodic CQI, until the available CQI from the user terminal is an aperiodic CQI. Thus, in this situation UTs which own a low quality of the available CQI shall wait and shall be delayed till they own a CQI of good quality. By doing so, MCSs and PRBs reflecting up-to-date channel conditions can be assigned to such UTs and the system throughput can be increased.

In an embodiment, however, the prioritizing of the UTs in the DL transmission scheduling is performed only when substantially all resource blocks of a downlink transmission subframe are allocated (high load), otherwise the scheduling of the UTs for downlink transmission takes place without prioritizing. Thus, in case of low load within a cell, the prioritization is not performed and UTs shall immediately be scheduled ignoring the quality of the CQI in order to prevent latencies.

The eNB 102 may further align an interval between transmissions of an uplink sounding reference signals (SRS) with the DRX cycle such that the SRS is transmitted within the first active period of each DRX cycle. Accordingly, the eNB 102 may receive the SRS from the UT 108 within the first period of each DRX cycle. In an embodiment, the SRS is sent on the first available sub-frame of the active period. The SRS information may also be used when performing scheduling. This is beneficial because the SRS locates in the same RB as the UL data, so the channel quality information the eNB extracts from the SRS is accurate. The benefit to align the SRS with the start of the active period is to make the UL scheduling dependent on the recent channel quality information. That is, according to the LTE, the CQI is an UL report and is used for DL scheduling, whereas channel quality based on the SRS can be determined in UL and is used for UL scheduling.

A very general architecture of the apparatus 700 according to an embodiment of the invention is shown in FIG. 7. FIG. 7 shows only the elements and functional entities required for understanding the apparatus 700 according to an embodiment of the invention. Other components have been omitted for reasons of simplicity. The implementation of the elements and functional entities may vary from that shown in FIG. 7.

The connections shown in FIG. 7 are logical connections, and the actual physical connections may be different. The connections can be direct or indirect and there can merely be a functional relationship between components. It is apparent to a person skilled in the art that the apparatus 700 may also comprise other functions and structures.

The apparatus 700 for performing the scheduling may comprise a processor 702. The processor 702 may be implemented with a separate digital signal processor provided with suitable software embedded on a computer readable medium, or with a separate logic circuit, such as an application specific integrated circuit (ASIC). The processor 702 may comprise an interface, such as computer port, for providing communication capabilities. The processor 702 may be, for example, a dualcore processor or a multiple-core processor. The apparatus 700 may comprise a memory 704 connected to the processor 702. However, memory may also be integrated to the processor 702 and, thus, no memory 704 may be required. The memory may be used to store the CQIs values, for example. The apparatus 700 may further comprise a transceiver (TRX) 706. The TRX 706 may further be connected to one or more antennas 708 enabling connection to and from an air interface.

The processor may comprise a timing circuitry 710 for performing different timing related functionalities. These functionalities comprise determination of the characteristics of the DRX, including the duration DRX cycle, for example. In addition, the characteristics of the CQI reporting may be determined in the timing circuitry 710. The characteristics of the CQI may comprise the interval between the periodic CQI reports, for example. Further, the alignment of the start of the DRX cycle with the periodicity of the CQI reporting may be performed here.

The processor 702 may comprise a scheduling circuitry 712 for scheduling the UTs. It may further take the periodic and/or aperiodic CQIs received by the TRX 706 into account when performing the scheduling. Further, the SRS's received may be taken into account. The scheduler circuitry 712 may prioritize the UTs according to the quality of the available CQIs from the UTs.

The processor 702 may, although not shown in FIG. 7, comprise a measuring circuitry. The measuring circuitry may be used in measurements for the sounding reference signal (SRS), for example.

FIG. 7 also shows an apparatus for transmitting information in an uplink transmission in a communication network. The apparatus may be a mobile station, a user terminal, for example.

The apparatus 720 for performing the scheduling may comprise a processor 722. The processor 722 may be implemented with a separate digital signal processor provided with suitable software embedded on a computer readable medium, or with a separate logic circuit, such as an application specific integrated circuit (ASIC). The processor 722 may comprise an interface, such as computer port, for providing communication capabilities. The processor 722 may be, for example, a dualcore processor or a multiple-core processor. The apparatus 720 may comprise a memory 724 connected to the processor 722. However, memory may also be integrated to the processor 722 and, thus, no memory 724 may be required. The memory may be used to store the CQIs values, for example. The apparatus 720 may further comprise a transceiver (TRX) 726. The TRX 726 may further be connected to one or more antennas 728 enabling connection to and from an air interface.

The processor 722 may comprise a measuring circuitry 730. The measuring circuitry 730 may be used to perform measurements for the CQI reports. There may further be a radio control circuitry 732 for controlling radio access, etc.

The apparatus 720 may obtain information related to the duration of a DRX cycle, wherein the beginning of the cycle triggers the first active period during which the apparatus is in an active mode, and information related to an interval between periodic CQI reports. The information may be received from the apparatus 700, for example.

The apparatus 720 may further transmit the periodic CQI during the first active period of the DRX cycle, thus providing an up-to-date CQI for the DRX cycle for the eNB. The apparatus 720 may further transmit, within the first active period of the DRX cycle, the periodic CQI at a subframe which is available for an uplink transmission and closest to the start of the DRX cycle, preferably at the first subframe of the DRX cycle.

Further, the apparatus may receive a grant for an uplink transmission of an aperiodic CQI report during the first active period and transmit the aperiodic CQI during the first active period.

Further, the apparatus may receive information regarding the interval between transmissions of an uplink SRS, wherein the interval between transmissions of the uplink SRS is aligned with the DRX cycle such that the SRS is transmitted within the first active period of each DRX cycle, transmit the SRS within the first period of each DRX cycle.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

FIG. 8 shows a method for scheduling user terminals for downlink transmission in a communication network. The method begins in step 800. In step 802, the duration of a discontinuous reception cycle for a user terminal is determined, wherein the beginning of the cycle triggers a first active period during which the user terminal is in an active mode. In step 804, an interval between periodic channel quality indicator reports is determined for the user terminal. In step 806, the discontinuous reception cycle is aligned with the interval between the periodic channel quality indicator reports such that the periodic channel quality indicator is transmitted within the first active period of the discontinuous reception cycle. Step 808 comprises receiving the periodic channel quality indicator during the first active period of each discontinuous reception cycle, thus obtaining an up-to-date channel quality indicator for the discontinuous reception cycle. Step 810 comprises scheduling the user terminals for downlink transmission by taking the received periodic channel quality indicator into account. The method ends in step 812.

FIG. 9 shows a method for transmitting information in an uplink transmission in a communication network. The method begins in step 900. In step 902, information related to the duration of a discontinuous reception cycle, wherein the beginning of the cycle triggers a first active period during which the apparatus is in an active mode, and information related to an interval between periodic channel quality indicator reports are obtained. Step 904 transmitting the periodic channel quality indicator during the first active period of the discontinuous reception cycle, thus providing an up-to-date channel quality indicator for each discontinuous reception cycle. The receiving end may apply the received CQI for DL scheduling, for example. The method ends in step 906.

The techniques and methods described herein may be implemented by various means. For example, these techniques may be implemented in hardware (one or more devices), firmware (one or more devices), software (one or more modules), or combinations thereof. For a hardware implementation, the apparatuses of FIG. 7 may be implemented within one or more application-specific integrated circuits (ASICs), digital signal processors (DSPs), digital signal processing devices (DSPDs), programmable logic devices (PLDs), field programmable gate arrays (FPGAs), processors, multi-core processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, an apparatus for scheduling user terminals for downlink transmission in a communication network comprises processing means for determining a duration of a discontinuous reception cycle for a user terminal, wherein the beginning of the cycle triggers a first active period during which the user terminal is in an active mode, processing means for determining an interval between periodic channel quality indicator reports for the user terminal, processing means for aligning the discontinuous reception cycle with the interval between the periodic channel quality indicator reports such that the periodic channel quality indicator is transmitted within the first active period of the discontinuous reception cycle, interface means for receiving the periodic channel quality indicator during the first active period of the discontinuous reception cycle, thus obtaining an up-to-date channel quality indicator for each discontinuous reception cycle, and processing means for scheduling the user terminals for downlink transmission by taking the received periodic channel quality indicator into account.

Thus, according to an embodiment, the apparatus for transmitting information in an uplink transmission in a communication network comprises processing means for obtaining information related to a duration of a discontinuous reception cycle, wherein the beginning of the cycle triggers a first active period during which the apparatus is in an active mode, and information related to an interval between periodic channel quality indicator reports, wherein the discontinuous reception cycle is aligned with the interval between the periodic channel quality indicator reports such that the periodic channel quality indicator is to be transmitted within the first active period of the discontinuous reception cycle, and interfacing means for transmitting the periodic channel quality indicator during the first active period of the discontinuous reception cycle, thus providing an up-to-date channel quality indicator for each discontinuous reception cycle.

Embodiments of the invention may be implemented as computer programs according to the embodiments. The computer program implemented may carry out, but is not limited to, the tasks related to FIGS. 1 to 9.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method comprising:
   determining a duration of a discontinuous reception cycle for a user terminal, wherein the beginning of the cycle triggers a first active period during which the user terminal is in an active mode;
   determining an interval between periodic channel quality indicator reports for the user terminal;
   aligning the discontinuous reception cycle with the interval between the periodic channel quality indicator reports such that the periodic channel quality indicator is transmitted within the first active period of the discontinuous reception cycle;
   receiving the periodic channel quality indicator during the first active period of the discontinuous reception cycle, obtaining an up-to-date channel quality indicator for the discontinuous reception cycle; and
   scheduling the user terminals for downlink transmission by taking the received periodic channel quality indicator into account.

2. The method of claim 1, wherein the duration of the discontinuous reception cycle is determined to be an integral multiple of the interval between the periodic channel quality indicator reports, wherein an up-to-date channel quality indicator is obtained for each discontinuous reception cycle.

3. The method of claim 1, the method further comprising:
   receiving, within the first active period of each discontinuous reception cycle, the periodic channel quality indicator at a subframe which is available for an uplink transmission and closest to the start of the discontinuous reception cycle, preferably at the first subframe of the discontinuous reception cycle.

4. The method of claim 1, the method further comprising:
   assigning a grant for an uplink transmission of an aperiodic channel quality indicator report during the first active period;
   receiving the aperiodic channel quality indicator during the first active period; and
   scheduling the user terminals for downlink transmission by taking the received aperiodic channel quality indicator into account.

5. The method of claim 4, the method further comprising:
   receiving the aperiodic channel quality indicator at the first subframe of the discontinuous reception cycle.

6. The method of claim 4, wherein performing the assignment of the grant and the reception of the aperiodic channel quality indicator is dependent on at least one of the following conditions: uplink transmission capacity exists, no user data needs to be sent in uplink, and substantially all resource blocks of a downlink transmission subframe are allocated.

7. The method of claim 1, the method further comprising:
   prioritizing the user terminals in the downlink transmission scheduling based on the quality of the available channel quality indicators from the user terminals, wherein the quality of the channel quality indicator is determined by the type of the channel quality indicator obtained from a user terminal and the increasing order of quality is as follows: a default channel quality indicator, a historical channel quality indicator, a periodic wideband channel quality indicator, a periodic frequency selective channel quality indicator, and an aperiodic channel quality indicator.

8. The method of claim 7, the method further comprising:
   assigning a probability for performing downlink transmission to a certain user terminal, wherein the probability is proportional to the quality of the available channel quality indicator such that the lower the quality of the available channel quality indicator from the user terminal is, the lower the probability for performing downlink transmission to the user terminal is; and
   utilizing the probability information when prioritizing.

9. The method of claim 7, the method further comprising:
   restraining downlink transmission to a certain user terminal if the available channel quality indicator of the user terminal is either the default channel quality indicator or the historical channel quality indicator, until the available channel quality indicator from the user terminal is either a periodic channel quality indicator or the aperiodic channel quality indicator.

10. The method of claim 1, the method further comprising:
    aligning an interval between transmissions of an uplink sounding reference signals with the discontinuous reception cycle such that the sounding reference signal is transmitted within the first active period of each discontinuous reception cycle;
    receiving the sounding reference signal within the first period of each discontinuous reception cycle; and
    scheduling the user terminals for uplink transmission by taking the received sounding reference signal into account.

11. An apparatus comprising:
    at least one processor and at least one memory including a computer program code, wherein the at least one memory and the computer program code are configured to, with the at least one processor, cause the apparatus at least to:

determine a duration of a discontinuous reception cycle for a user terminal, wherein the beginning of the cycle triggers a first active period during which the user terminal is in an active mode;

determine an interval between periodic channel quality indicator reports for the user terminal;

align the discontinuous reception cycle with the interval between the periodic channel quality indicator reports such that the periodic channel quality indicator is transmitted within the first active period of the discontinuous reception cycle;

receive the periodic channel quality indicator during the first active period of the discontinuous reception cycle, obtaining an up-to-date channel quality indicator for the discontinuous reception cycle; and schedule the user terminals for downlink transmission by taking the received periodic channel quality indicator into account.

12. The apparatus of claim 11, wherein the duration of the discontinuous reception cycle is determined to be an integral multiple of the interval between the periodic channel quality indicator reports, wherein an up-to-date channel quality indicator is obtained for each discontinuous reception cycle.

13. The apparatus of claim 11, wherein the at least one memory and the computer program code are further configured, with the at least one processor, to cause the apparatus at least to:

receive, within the first active period of each discontinuous reception cycle, the periodic channel quality indicator at a subframe which is available for an uplink transmission and closest to the start of the discontinuous reception cycle, preferably at the first subframe of the discontinuous reception cycle.

14. The apparatus of claim 11, wherein the at least one memory and the computer program code are further configured, with the at least one processor, to cause the apparatus at least to:

assign a grant for an uplink transmission of an aperiodic channel quality indicator report during the first active period;

receive the aperiodic channel quality indicator during the first active period; and schedule the user terminals for downlink transmission by taking the received aperiodic channel quality indicator into account.

15. The apparatus of claim 14, wherein the at least one memory and the computer program code are further configured, with the at least one processor, to cause the apparatus at least to:

receive the aperiodic channel quality indicator at the first subframe of the discontinuous reception cycle.

16. The apparatus of claim 14, wherein performing the assignment of the grant and the reception of the aperiodic channel quality indicator is dependent on at least one of the following conditions: uplink transmission capacity exists, no user data needs to be sent in uplink, and substantially all resource blocks of a downlink transmission sub-frame are allocated.

17. The apparatus of claim 11, wherein the at least one memory and the computer program code are further configured, with the at least one processor, to cause the apparatus at least to:

prioritize the user terminals in the downlink transmission scheduling based on the quality of the available channel quality indicators from the user terminals, wherein the quality of the channel quality indicator is determined by the type of the channel quality indicator obtained from a user terminal and the increasing order of quality is as follows: a default channel quality indicator, a historical channel quality indicator, a periodic wideband channel quality indicator, a periodic frequency selective channel quality indicator, and an aperiodic channel quality indicator.

18. The apparatus of claim 17, wherein the at least one memory and the computer program code are further configured, with the at least one processor, to cause the apparatus at least to:

assign a probability for performing downlink transmission to a certain user terminal, wherein the probability is proportional to the quality of the available channel quality indicator such that the lower the quality of the available channel quality indicator from the user terminal is, the lower the probability for performing downlink transmission to the user terminal is; and utilize the probability information when prioritizing.

19. The apparatus of claim 17, wherein the at least one memory and the computer program code are further configured, with the at least one processor, to cause the apparatus at least to:

restraining downlink transmission to a certain user terminal if the available channel quality indicator of the user terminal is either the default channel quality indicator or the historical channel quality indicator, until the available channel quality indicator from the user terminal is the a periodic channel quality indicator or the aperiodic channel quality indicator.

20. The apparatus of claim 11, wherein the at least one memory and the computer program code are further configured, with the at least one processor, to cause the apparatus at least to:

align an interval between transmissions of an uplink sounding reference signals with the discontinuous reception cycle such that the sounding reference signal is transmitted within the first active period of each discontinuous reception cycle; receive the sounding reference signal within the first period of each discontinuous reception cycle; and schedule the user terminals for uplink transmission by taking the received sounding reference signal into account.

21. An apparatus comprising:

at least one processor and at least one memory including a computer program code, wherein the at least one memory and the computer program code are configured to, with the at least one processor, cause the apparatus at least to:

obtain information related to a duration of a discontinuous reception cycle, wherein the beginning of the cycle triggers a first active period during which the apparatus is in an active mode, and information related to an interval between periodic channel quality indicator reports, wherein the discontinuous reception cycle is aligned with the interval between the periodic channel quality indicator reports such that the periodic channel quality indicator is to be transmitted within the first active period of the discontinuous reception cycle; and transmit the periodic channel quality indicator during the first active period of the discontinuous reception cycle, providing an up-to-date channel quality indicator for scheduling during the discontinuous reception cycle.

22. The apparatus of claim 21, wherein the duration of the discontinuous reception cycle is determined to be an integral multiple of the interval between the periodic channel quality indicator reports, wherein an up-to-date channel quality indicator is obtained for each discontinuous reception cycle.

23. The apparatus of claim 21, the apparatus being further caused to:
    transmit, within the first active period of each discontinuous reception cycle, the periodic channel quality indicator at a subframe which is available for an uplink transmission and closest to the start of the discontinuous reception cycle, preferably at the first subframe of the discontinuous reception cycle.

24. The apparatus of claim 21, the apparatus being further caused to:
    receive a grant for an uplink transmission of an aperiodic channel quality indicator report during the first active period; and
    transmit the aperiodic channel quality indicator during the first active period.

25. The apparatus of claim 24, the apparatus being further caused to:
    transmit the aperiodic channel quality indicator at the first subframe of the discontinuous reception cycle.

26. The apparatus of claim 24, wherein the transmission of the aperiodic channel quality indicator is dependent on at least one of the following conditions: uplink transmission capacity exists, no user data needs to be sent in the uplink, and substantially all resource blocks of a downlink transmission subframe are allocated.

27. The apparatus of claim 21, the apparatus being further caused to:
    obtain information regarding an interval between transmissions of an uplink sounding reference signals, wherein the interval between transmissions of the uplink sounding reference signals is aligned with the discontinuous reception cycle such that the sounding reference signal is transmitted within the first active period of each discontinuous reception cycle; and
    transmit the sounding reference signal within the first period of each discontinuous reception cycle so that the transmitted sounding reference signal is taken into account when the user terminals are scheduled for uplink transmission.

28. A computer program product embodied on a non-transitory medium readable by a computer and comprising program instructions which, when loaded into an apparatus, are configured to control or carry out:
    determining a duration of a discontinuous reception cycle for a user terminal, wherein the beginning of the cycle triggers a first active period during which the user terminal is in an active mode;
    determining an interval between periodic channel quality indicator reports for the user terminal;
    aligning the discontinuous reception cycle with the interval between the periodic channel quality indicator reports such that the periodic channel quality indicator is transmitted within the first active period of the discontinuous reception cycle;
    receiving the periodic channel quality indicator during the first active period of the discontinuous reception cycle, obtaining an up-to-date channel quality indicator for the discontinuous reception cycle; and
    scheduling the user terminals for downlink transmission by taking the received periodic channel quality indicator into account.

* * * * *